US008654108B2

(12) United States Patent
Tanaka et al.

(10) Patent No.: US 8,654,108 B2
(45) Date of Patent: Feb. 18, 2014

(54) LIQUID CRYSTAL DISPLAY DEVICE

(75) Inventors: Shinya Tanaka, Osaka (JP); Tetsuo Kikuchi, Osaka (JP); Junya Shimada, Osaka (JP); Takuya Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 203 days.

(21) Appl. No.: 13/393,812

(22) PCT Filed: Apr. 13, 2010

(86) PCT No.: PCT/JP2010/056573
§ 371 (c)(1),
(2), (4) Date: Mar. 1, 2012

(87) PCT Pub. No.: WO2011/036911
PCT Pub. Date: Mar. 31, 2011

(65) Prior Publication Data

US 2012/0162179 A1 Jun. 28, 2012

(30) Foreign Application Priority Data

Sep. 25, 2009 (JP) ................................ 2009-220158

(51) Int. Cl.
*G09G 5/00* (2006.01)
*G06F 3/038* (2013.01)

(52) U.S. Cl.
USPC ................ 345/204; 345/92; 345/100; 257/59

(58) Field of Classification Search
USPC ........... 345/44, 64, 76, 87, 92, 100, 204–206, 345/211, 214; 257/59, 203
See application file for complete search history.

(56) References Cited

U.S. PATENT DOCUMENTS

| | | | | |
|---|---|---|---|---|
| 5,610,414 | A | 3/1997 | Yoneda et al. | |
| 7,061,463 | B2 * | 6/2006 | Crossland et al. | 345/97 |
| 8,519,764 | B2 * | 8/2013 | Iwamoto et al. | 327/199 |
| 8,531,224 | B2 * | 9/2013 | Iwamoto et al. | 327/199 |
| 8,565,369 | B2 * | 10/2013 | Takahashi et al. | 377/64 |
| 2003/0222311 | A1 | 12/2003 | Kim | |
| 2004/0150610 | A1 * | 8/2004 | Zebedee et al. | 345/100 |
| 2005/0008114 | A1 * | 1/2005 | Moon | 377/64 |
| 2006/0146218 | A1 | 7/2006 | Her et al. | |
| 2006/0267911 | A1 * | 11/2006 | Jang | 345/100 |
| 2006/0267913 | A1 | 11/2006 | Mochizuki et al. | |

(Continued)

FOREIGN PATENT DOCUMENTS

| | | | |
|---|---|---|---|
| JP | 07-120788 | A | 5/1995 |
| JP | 11-202295 | A | 7/1999 |

(Continued)

*Primary Examiner* — Joe H Cheng
(74) *Attorney, Agent, or Firm* — Chen Yoshimura LLP

(57) ABSTRACT

In a liquid crystal display device provided with a monolithic gate driver, a panel frame area is to be reduced as compared with a conventional configuration so that the device size can be reduced. In a region on an array substrate located outside of a display region, a third metal (503) is formed as a metal film in addition to a source metal (501) and a gate metal (502). The source metal (501) forms a wiring pattern that includes source electrodes of thin film transistors disposed in a pixel circuit and a gate driver, and the gate metal (502) forms a wiring pattern that includes gate electrodes of the thin film transistors. The third metal (503) is electrically connected to at least one of the source metal (501) and the gate metal (502) through a contact.

8 Claims, 16 Drawing Sheets

(56) References Cited

U.S. PATENT DOCUMENTS

| | | | | |
|---|---|---|---|---|
| 2010/0194723 | A1 | 8/2010 | Moriwaki | |
| 2010/0321372 | A1* | 12/2010 | Iwamoto et al. | 345/212 |
| 2011/0018845 | A1* | 1/2011 | Mizunaga et al. | 345/204 |
| 2011/0134090 | A1* | 6/2011 | Iwamoto et al. | 345/206 |
| 2011/0199354 | A1* | 8/2011 | Iwase et al. | 345/208 |
| 2012/0146969 | A1* | 6/2012 | Sakamoto et al. | 345/204 |
| 2012/0218245 | A1* | 8/2012 | Morii et al. | 345/211 |
| 2012/0229712 | A1* | 9/2012 | Yoshida et al. | 348/792 |
| 2012/0327057 | A1* | 12/2012 | Sakamoto et al. | 345/211 |
| 2013/0009856 | A1* | 1/2013 | Takahashi et al. | 345/92 |
| 2013/0009925 | A1* | 1/2013 | Ueda et al. | 345/204 |
| 2013/0069930 | A1* | 3/2013 | Fukaya et al. | 345/214 |

FOREIGN PATENT DOCUMENTS

| | | | |
|---|---|---|---|
| JP | 2005-50502 | A | 2/2005 |
| JP | 2005-527856 | A | 9/2005 |
| JP | 2006-191026 | A | 7/2006 |
| JP | 2007-272162 | A | 10/2007 |
| JP | 2009-128533 | A | 6/2009 |
| WO | 2009/016858 | A1 | 2/2009 |

* cited by examiner

LIQUID CRYSTAL DISPLAY DEVICE

TECHNICAL FIELD

The present invention relates to a liquid crystal display device, and more particularly, to a liquid crystal display device provided with a monolithic gate driver.

BACKGROUND ART

Conventionally, in a liquid crystal display device employing an a-Si TFT liquid crystal panel (a liquid crystal panel that uses amorphous silicon for semiconductor layers of thin film transistors), because of the relatively small mobility of the amorphous silicon, a gate driver for driving gate bus lines (scanning signal lines) has been provided as an IC (Integrated Circuit) chip in a peripheral portion of a substrate that constitutes the panel. However, in recent years, a technique to form the gate driver directly on the substrate has been employed so as to achieve a reduction in device size, a lower cost, and the like. Such a gate driver is referred to as a "monolithic gate driver" or the like. Also, a panel provided with the monolithic gate driver is referred to as a "gate driver monolithic panel" or the like.

FIG. 11 is a block diagram showing an example of a configuration of a gate driver (monolithic gate driver) in a liquid crystal display device employing a gate driver monolithic panel. As shown in FIG. 11, the gate driver includes a shift register 400 made of a plurality of stages (disposed as many as the number of the gate bus lines). The respective stages of the shift register 400 are bistable circuits SR that are in one of two states (first state and second state) at each point in time and that output signals that indicate the above-mentioned state as scanning signals GOUT, respectively. That is, the shift register 400 is made of a plurality of bistable circuits SR. Each of the bistable circuits SR includes input terminals for receiving two-phase clock signals CKA (hereinafter referred to as "first clock") and CKB (hereinafter referred to as "second clock"), respectively, an input terminal for receiving a low-level supply voltage VSS, an input terminal for receiving a clear signal CLR, an input terminal for receiving a set signal SET, an input terminal for receiving a reset signal RESET, and an output terminal for outputting the scanning signal GOUT. The scanning signals GOUT that are output from the respective stages (bistable circuits) are provided to corresponding gate bus lines GL, respectively. The scanning signals GOUT are also provided to the subsequent stages as the set signals SET, and the preceding stages as the reset signals RESET, respectively. A region where the bistable circuits SR constituting the shift register 400 are formed will be referred to as a "driver circuit region" below.

In FIG. 11, to the left of the driver circuit region, a main wiring line (trunk wiring line) for a gate start pulse signal GSP that is to be provided as the set signal SET to the bistable circuit SR in the first stage, a main wiring line for the low-level supply voltages VSS, a main wiring line for first gate clock signals CLK1 that are to be provided as the first clock CKA or the second clock CKB to the respective bistable circuits SR, a main wiring line for second gate clock signals CLK2 that are to be provided as the first clock CKA or the second clock CKB to the respective bistable circuits SR, and a main wiring line for clear signals CLR are formed. A region including the above-mentioned signal wiring lines for transmitting signals that drive the shift register 400 to perform a shift operation will be referred to as a "driving signal main wiring region" below. In FIG. 11, to the right of the driver circuit region, a display section for displaying images is disposed. In the display section, a pixel circuit including the gate bus lines GL, auxiliary capacitance wiring lines CSL, and the like is formed. The display section may also be referred to as a "display region" below. Between the driver circuit region and the display region, an auxiliary capacitance main wiring line CSML is formed to transmit voltage signals that are to be applied to the respective auxiliary capacitance wiring lines CSL disposed in the display section.

FIG. 12 is a circuit diagram showing an example of a configuration of one stage of the shift register 400 constituting a monolithic gate driver, that is, a configuration of the bistable circuit SR. As shown in FIG. 12, the bistable circuit includes five thin film transistors (TFTs) T41, T42, T43, T44, and T45, and a capacitor Cap. This bistable circuit also includes an input terminal for the low-level supply voltage VSS, five input terminals 41 to 45, and one output terminal (output node) 46. The source terminal of the thin film transistor T41, the drain terminal of the thin film transistor T42, and the gate terminal of the thin film transistor T43 are connected with each other. For convenience, a region (wiring line) where they are connected with each other is referred to as "netA." In the thin film transistor T41, the gate terminal and the drain terminal are connected to the input terminal 41 (that is, a diode-connected transistor), and the source terminal is connected to netA. In the thin film transistor T42, the gate terminal is connected to the input terminal 42, the drain terminal is connected to netA, and the source terminal is connected to the supply voltage VSS. In the thin film transistor T43, the gate terminal is connected to netA, the drain terminal is connected to the input terminal 43, and the source terminal is connected to the output terminal 46. In the thin film transistor T44, the gate terminal is connected to the input terminal 44, the drain terminal is connected to the output terminal 46, and the source terminal is connected to the supply voltage VSS. In the thin film transistor T45, the gate terminal is connected to the input terminal 45, the drain terminal is connected to the output terminal 46, and the source terminal is connected to the supply voltage VSS. In the capacitor Cap, one end is connected to netA and the other end is connected to the output terminal 46.

Among the above-mentioned five thin film transistors, the thin film transistor T43 functions as an output transistor in this bistable circuit. An output transistor is a transistor that has one of the conductive terminals (source terminal in this case) connected to the output terminal in the bistable circuit and that is used to control a potential of the scanning signal by changing a potential of the control terminal of the transistor (gate terminal in this case).

Next, with reference to FIGS. 12 and 13, operations of the respective stages (bistable circuits) of the shift register 400 will be explained. The input terminal 43 is provided with the first clock CKA that is increased to a higher level in every other horizontal scanning period. The input terminal 44 is provided with the second clock CKB that is 180-degree out of phase with the first clock CKA. During the period prior to a point t0, the potential of netA and the potential of the scanning single GOUT (output terminal 46) stay at a low level.

At the point t0, a pulse of the set signal SET is applied to the input terminal 41. The point t0 is the time when the gate bus line GL connected to the preceding stage is turned to the selected state. Because the thin film transistor T41 is a diode-connected transistor as shown in FIG. 12, the thin film transistor T41 is turned to the ON state by the pulse of the set signal SET, thereby charging the capacitor Cap. This raises the potential of netA from a low level to a high level, and therefore turns the thin film transistor T43 to the ON state. During the period between t0 and t1, the first clock CKA stays at a low level. Therefore, during this period, the scanning signal GOUT is maintained at a low level. Also, during this period, the reset signal RESET stays at a low level, thereby maintaining the OFF state of the thin film transistor T42. This prevents the potential of netA from lowering during this period.

At the point t1, the first clock CKA rises to a high level from a low level. Because the thin film transistor T43 is in the ON state at this time, the potential of the output terminal 46 increases in accordance with the increase in the potential of the input terminal 43. The capacitor Cap is formed between netA and the output terminal 46 as shown in FIG. 12, and therefore, with the increase in the potential of the output terminal 46, the potential of netA is also increased (netA is bootstrapped). As a result, a high voltage is applied to the gate terminal of the thin film transistor T43, causing the potential of the scanning signal GOUT to rise to the same level as the high-level potential of the first clock CKA. This makes the gate bus line GL connected to the output terminal 46 of this bistable circuit turn to a selected state. During the period between t1 and t2, the second clock CKB and the clear signal CLR stay at a low level. This maintains the OFF state of the thin film transistors T44 and T45, and therefore, the potential of the scanning signal GOUT is not lowered during this period.

At the point t2, the first clock CKA lowers to a low level from a high level. This causes the potential of the input terminal 43 and the potential of the output terminal 46 to drop, which also lowers the potential of netA through the capacitor Cap. Also, at the point t2, a pulse of the reset signal RESET is applied to the input terminal 42, causing the thin film transistor T42 to turn to the ON state. As a result, the potential of netA is changed from a high level to a low level. Further, at the point t2, the second clock CKB is increased to a high level from a low level, causing the thin film transistor T44 to turn to the ON state. As a result, the potential of the output terminal 46, which is the potential of the scanning signal GOUT, lowers to a low level.

The scanning signals GOUT that are output from the respective stages (bistable circuits) in the manner described above are provided to the subsequent stages, respectively, as set signals as shown in FIG. 11. This turns the plurality of gate bus lines GL disposed in the display section to the selected state sequentially, one line for every horizontal scanning period. The clear signal CLR is increased to a high level at the start of the operation of this liquid crystal display device, at the start of each vertical scanning period, or the like. By the clear signal CLR reaching a high level, in all bistable circuits, the thin film transistors T45 are turned to the ON state, causing the potential of the output terminals 46, which is the potential of the scanning signals GOUT, to drop to a low level.

Here, to take a close look at the configuration of the bistable circuit shown in FIG. 12, the capacitor Cap is formed between netA and the output terminal 46, that is, between the gate and the source of thin film transistor T43. The capacitor Cap functions as a bootstrap capacitor for increasing the potential of netA with the increase in the potential of the output terminal 46. As described above, the monolithic gate driver is configured to have the bootstrap capacitor so that a higher potential than the supply potential can be generated, and the output transistor (the thin film transistor T43 in FIG. 12) can be switched from the OFF state to the ON state in a short period of time, thereby minimizing an output loss.

In relation to the present invention, the following related art documents are known. Japanese Patent Application Laid-Open Publication No. 2005-50502 discloses a configuration of a shift register for a monolithic gate driver that uses a bootstrap capacitor. Published Patent Application, Japanese Translation of PCT International Application No. 2005-527856 discloses a layout diagram of a monolithic gate driver.

RELATED ART DOCUMENTS

Patent Documents

Patent Document 1: Japanese Patent Application Laid-Open Publication No. 2005-50502

Patent Document 2: Published Patent Application, Japanese Translation of PCT International Application No. 2005-527856

SUMMARY OF THE INVENTION

Problems to be Solved by the Invention

One of two substrates that constitute a liquid crystal panel is referred to as an "array substrate" or the like. The gate driver and the pixel circuit are disposed in this array substrate. The array substrate has a laminated structure that forms these circuits, and the laminated structure includes two metal films (metal layers). FIG. 14 is a partial cross-sectional view of an array substrate in a conventional configuration. As shown in FIG. 14, a metal film 802, a protective film 812, a metal film 801, and a protective film 811 are laminated on a glass substrate 800. The metal film 801 is used to form source electrodes (and drain electrodes) of thin film transistors disposed in the gate driver and the pixel circuit. Therefore, this metal film 801 will be referred to as a "source metal" 801 below. The metal film 802 is used to form gate electrodes of the thin film transistors. Therefore, this metal film 802 will be referred to as a "gate metal" 802 below. The protective film 811 formed so as to cover the source metal 801 will be referred to as a "first protective film" 811 below, and the protective film 812 formed so as to cover the gate metal 802 will be referred to as a "second protective film" 812 below. The source metal 801 and the gate metal 802 are not only used as the electrodes of the thin film transistors, but also used as wiring patterns (for various signals) that are disposed in the gate driver or in the pixel circuit.

In the configuration described above, the bootstrap capacitor in the bistable circuit is provided by a capacitance formed between the gate metal 802 and the source metal 801. Also, as shown in FIG. 15, the bootstrap capacitor is formed in a region adjacent to a region where the output transistor is formed (hereinafter referred to as "output transistor region") in the driver circuit region. In the gate driver monolithic panel, as a gate load capacity becomes greater, the bootstrap capacitor (capacitance value) needs to be larger. According to the conventional configuration, in order to increase the bootstrap capacitor, it is necessary to enlarge an area of a bootstrap capacitor region shown in FIG. 15. That is, as the gate load capacity becomes greater, the larger panel frame area is required, but because the reduction in device size is strongly demanded, it is not desirable to increase the panel frame area.

To address the problem, the present invention is aiming at, in the liquid crystal display device having a monolithic gate driver, reducing the panel frame area as compared with the conventional device so that the device size can be reduced.

Means for Solving the Problems

A first aspect of the present invention is a liquid crystal display device including:

a substrate;

a pixel circuit formed in a display region that is a region on the substrate provided for displaying an image;

a plurality of scanning signal lines that are formed in the display region and that constitute a part of the pixel circuit; and a scanning signal line driver circuit that is formed in a region outside of the display region and that includes a shift register made of a plurality of bistable circuits connected in series with each other, the plurality of bistable circuits each having a first state and a second state and turning to the first state sequentially in accordance with a plurality of clock signals received from the outside, the scanning signal line driver circuit selectively driving the plurality of scanning signal lines, wherein the substrate has a layered structure that includes a first metal film that forms a wiring pattern including source electrodes of thin film transistors that are provided in the pixel circuit and in the scanning signal line driver circuit, a second metal film that forms a wiring pattern including gate electrodes of the thin film transistors, and a third metal film that is formed in a region outside of the display region, and wherein the third metal film is electrically connected to at least one of the first metal film and the second metal film through a contact disposed in a region outside of the display region.

A second aspect of the present invention is the first aspect of the present invention, wherein each of the bistable circuits includes:

an output node that is connected to a corresponding scanning signal line and that outputs a scanning signal indicating one of the first state and the second state;

an output control thin film transistor that includes a first electrode as a gate electrode, a second electrode as one of a drain electrode and a source electrode that receives one of the plurality of clock signals, and a third electrode as the other of the drain electrode and the source electrode that is connected to the output node, the output control thin film transistor controlling a potential of the third electrode based on a voltage applied to the first electrode; and a capacitance formed between the first electrode and the third electrode, wherein the capacitance is formed by the second metal film that forms the first electrode and the third metal film that is electrically connected through the contact to the first metal film that forms the third electrode in a layer above or below a region where the output control thin film transistor is formed.

A third aspect of the present invention is the first aspect of the present invention, wherein the liquid crystal display device further includes:

a pixel electrode that is disposed in a matrix in the display region;

a plurality of auxiliary capacitance wiring lines disposed in the display region so as to form an auxiliary capacitance with the pixel electrode;

an auxiliary capacitance main wiring line that is formed in a region outside of the display region by the first metal film or the second metal film so as to transmit a voltage signal that is to be applied to the plurality of auxiliary capacitance wiring lines; and a main wiring line for a supply voltage that transmits a reference potential signal so that a prescribed reference potential is provided to the plurality of bistable circuits, wherein the main wiring line for the supply voltage is formed by the third metal film in a layer above or below a region where the auxiliary capacitance main wiring line is formed.

A fourth aspect of the present invention is the first aspect of the present invention, wherein the liquid crystal display device further includes:

a driving signal main wiring line formed in the region outside of the display region for transmitting a plurality of control signals that are to be provided to the plurality of bistable circuits so as to drive the shift register to perform a shift operation, wherein the driving signal main wiring line is formed by the third metal film in a layer above or below a region where the plurality of bistable circuits are formed.

A fifth aspect of the present invention is the fourth aspect of the present invention, wherein the driving signal main wiring line includes a main wiring line for the plurality of clock signals, a main wiring line for a start signal that instructs the shift register to start the shift operation, and a main wiring line for a clear signal that turns all of the plurality of bistable circuits to the second state.

A sixth aspect of the present invention is the first aspect of the present invention, wherein the liquid crystal display device further includes:

a pixel electrode that is disposed in a matrix in the display region;

a plurality of auxiliary capacitance wiring lines formed in the display region so as to form an auxiliary capacitance with the pixel electrode;

an auxiliary capacitance main wiring line that is formed in a region outside of the display region by the first metal film or the second metal film so as to transmit a voltage signal that is to be applied to the plurality of auxiliary capacitance wiring lines;

a main wiring line for a supply voltage that transmits a reference potential signal so that a prescribed reference potential is provided to the plurality of bistable circuits; and a driving signal main wiring line formed in the region outside of the display region for transmitting a plurality of control signals that are to be provided to the plurality of bistable circuits so as to drive the shift register to perform a shift operation, wherein the main wiring line for the supply voltage is formed by the third metal film in a layer above or below a region where the auxiliary capacitance main wiring line is formed, and wherein the driving signal main wiring line is formed by the third metal film in a layer above or below the region where the plurality of bistable circuits are formed.

A seventh aspect of the present invention is the first aspect of the present invention, wherein the third metal film is made of a same type of metal as the first metal film or the second metal film.

An eighth aspect of the preset invention is the first aspect of the present invention, wherein amorphous silicon is used for a semiconductor layer of the thin film transistors disposed in the pixel circuit and in the scanning signal line driver circuit.

Effects of the Invention

According to the first aspect of the present invention, in the liquid crystal display device including the monolithic gate driver, the substrate provided with the pixel circuit and the scanning signal line driver circuit, i.e., the array substrate, includes the third metal film as a metal film, in addition to the first metal and the second metal film. The first metal film forms the wiring pattern including the source electrode of the thin film transistor, and the second metal film forms the wiring pattern including the gate electrode of the thin film transistor. The third metal film is electrically connected to the first metal film or the second metal film through a contact. This makes it possible to use the third metal film to achieve a configuration that has been conventionally provided by using the first metal film or the second metal film. In this case, a plurality of constituting elements that had to be disposed in the horizontal direction on the array substrate can be disposed in the vertical direction on the array substrate. This allows for a reduction in panel frame area as compared with the conventional configuration, leading to the reduction in size of the liquid crystal display device including the monolithic gate driver.

According to the second aspect of the present invention, in each of the bistable circuits of the shift register that constitutes the scanning signal line driver circuit, a so-called bootstrap capacitor is provided by the capacitance formed between the second metal film and the third metal film in a layer above or below the region where the output control thin film transistor is formed (hereinafter referred to as "output control thin film transistor region"). The bootstrap capacitor is used to increase the potential of the first electrode (gate potential) with increase in the potential of the third electrode (source potential) of the output control thin film transistor. This eliminates the need for a region that has been required near the output control thin film transistor region to form the bootstrap capacitor in the conventional configuration. This makes it possible to reduce the area of the driver circuit region (a region where the bistable circuits are formed) as compared with the conventional configuration, thereby allowing the panel frame area to be smaller than that of the conventional configuration.

According to the third aspect of the present invention, the main wiring line for the supply voltage that provides a reference potential to the bistable circuits is formed by the third metal film in a layer above or below the region where the auxiliary capacitance main wiring line is formed. This makes it possible to reduce the panel frame area as compared with the conventional configuration where the main wiring line for the supply voltage and the auxiliary capacitance main wiring line were disposed in the horizontal direction on the array substrate.

According to the fourth aspect of the present invention, the bistable circuits that constitute the shift register, and the driving signal main wiring line that transmits control signals for driving the shift register are disposed in the vertical direction on the array substrate. This makes it possible to reduce the panel frame area as compared with the conventional configuration where the driving signal main wiring line was disposed in the peripheral region of the driver circuit region.

According to the fifth aspect of the present invention, the bistable circuits that constitute the shift register, and main wiring lines for various control signals for driving the shift register are disposed in the vertical direction on the array substrate. This makes it possible to reduce the panel frame area more effectively as compared with the conventional configuration.

According to the sixth aspect of the present invention, in a manner similar to the third aspect of the present invention, the main wiring line for the supply voltage that provides a reference potential to the bistable circuits is formed by the third metal film in a layer above or below the region where the auxiliary capacitance main wiring line is formed. Also, in a manner similar to the fourth aspect of the present invention, the bistable circuits that constitute the shift register, and the driving signal main wiring line that transmits control signals for driving the shift register are disposed in the vertical direction on the array substrate. This makes it possible to significantly reduce the panel frame area as compared with the conventional configuration.

According to the seventh aspect of the present invention, a liquid crystal display device having the effects similar to those of the first aspect of the present invention can be provided without creating a need to prepare a new type of metal for the third metal film in the manufacturing process of the array substrate.

According to the eighth aspect of the present invention, in a liquid crystal display device employing an a-Si TFT liquid crystal panel, which has been relatively difficult to reduce the device size, the frame area can be made smaller than the conventional configuration, thereby achieving the reduction in size.

DETAILED DESCRIPTION OF EMBODIMENTS

Embodiments of the present invention will be explained below with reference to accompanying figures.

1. Embodiment 1

1.1 Overall Configuration

Figure 2:
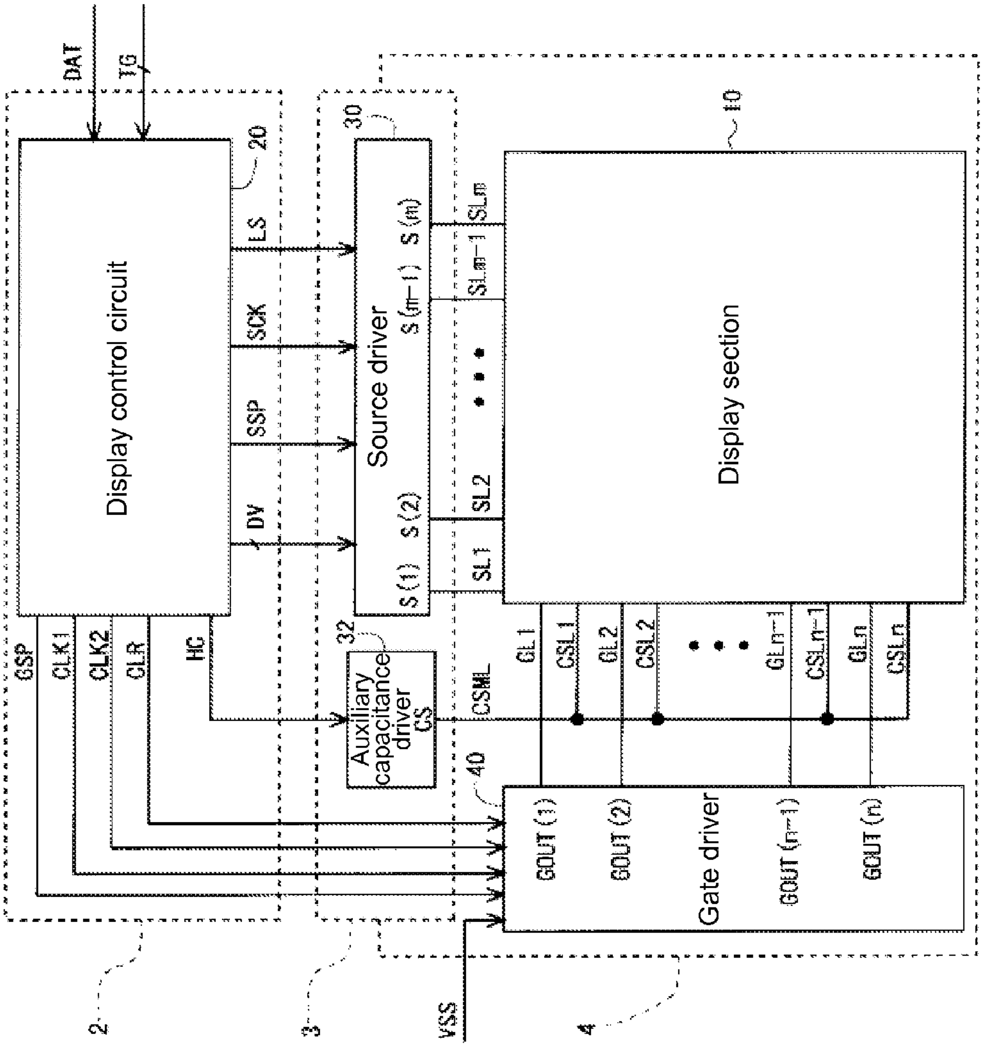
FIG. 2 is a block diagram showing an overall configuration of the liquid crystal display device according to Embodiment 1 above.

FIG. 2 is a block diagram showing an overall configuration of an active matrix type liquid crystal display device according to Embodiment 1 of the present invention. As shown in FIG. 2, this liquid crystal display device includes a display section 10, a display control circuit 20, a source driver (image signal line driver circuit) 30, an auxiliary capacitance driver (auxiliary capacitance driver circuit) 32, and a gate driver (scanning signal line driver circuit) 40. The display control circuit 20 is formed on a control substrate 2. The source driver 30 and the auxiliary capacitance driver 32 are formed on a flexible substrate 3. The gate driver 40 is formed on an array substrate 4 that is one of two substrates that constitute a liquid crystal panel. That is, the gate driver 40 in this embodiment is a monolithic gate driver. As the liquid crystal panel, an "a-Si TFT liquid crystal panel" that uses amorphous silicon for semiconductor layers of thin film transistors thereof is employed. Generally, the liquid crystal display device is also equipped with a common driver for driving a common electrode that will be explained later, but because the common driver does not directly relate to the present invention, it will not be explained here nor shown in the figure.

Figure 3:
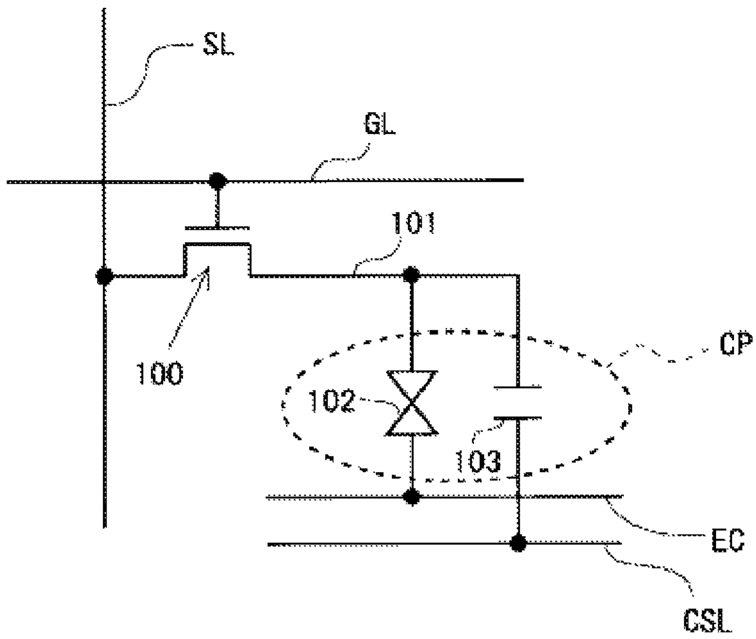
FIG. 3 is a circuit diagram showing a configuration of a pixel forming section in Embodiment 1 above.

In the display section 10, a plurality (m) of source bus lines (image signal lines) SL1 to SLm and a plurality (n) of gate bus lines (scanning signal lines) GL1 to GLn are formed. The display section 10 also includes a plurality (n×m) of pixel forming sections that are disposed so as to correspond to the respective intersections of those source bus lines SL1 to SLm and gate bus lines GL1 to GLn. FIG. 3 is a circuit diagram showing a configuration of the pixel forming section. As shown in FIG. 3, each pixel forming section includes a TFT 100, a pixel electrode 101, a common electrode EC, an auxiliary capacitance wiring line CSL, a liquid crystal capacitance 102, and an auxiliary capacitance 103. In the TFT 100, the gate electrode is connected to a gate bus line GL that passes through a corresponding intersection, and the source electrode is connected a source bus line SL that passes through the same intersection. The pixel electrode 101 is connected to the drain electrode of the TFT 100. The common electrode EC and the auxiliary capacitance wiring line CSL are disposed commonly for a plurality of pixel forming sections. The liquid crystal capacitance 102 is formed by the pixel electrode 101 and the common electrode EC. The auxiliary capacitance 103 is formed by the pixel electrode 101 and the auxiliary capacitance wiring line CSL. A pixel capacitance CP is formed by the liquid crystal capacitance 102 and the auxiliary capacitance 103. The pixel capacitance CP holds a voltage indicating a pixel value in accordance with an image signal provided to the source electrode of each TFT 100 by the source bus line SL when an active scanning signal is provided to the gate electrode of the TFT 100 by the gate bus line GL.

The display control circuit 20 receives an image signal DAT and a timing signal group TG such as a horizontal synchronization signal and a vertical synchronization signal sent from the outside, and outputs a digital image signal DV. The display control circuit 20 also outputs a source start pulse signal SSP, a source clock signal SCK, a latch strobe signal LS, a gate start pulse signal GSP, a first gate clock signal CLK1, a second gate clock signal CLK2, and a clear signal CLR for controlling an image display in the display section 10, and an auxiliary capacitance driver control signal HC for controlling an operation of the auxiliary capacitance driver 32. The auxiliary capacitance driver 32 outputs an auxiliary capacitance driving signal CS in accordance with the auxiliary capacitance driver control signal HC that is output from the display control circuit 20. The auxiliary capacitance driving signal CS is sent to the respective auxiliary capacitance wiring lines CSL1 to CSLn through the auxiliary capacitance main wiring line CSML.

The source driver 30 receives the digital image signal DV, the source start pulse signal SSP, the source clock signal SCK, and the latch strobe signal LS that are output from the display control circuit 20, and applies driving image signals S(1) to S(m) to the respective source bus lines SL1 to SLm. The gate driver 40 repeatedly applies active scanning signals GOUT (1) to GOUT(n) to the respective gate bus lines GL1 to GLn for every vertical scanning period in accordance with the gate start pulse signal GSP, the first gate clock signal CLK1, the second gate clock signal CLK2, and the clear signal CLR that are output from the display control circuit 20, and the supply voltage VSS provided by a prescribed power supply circuit (not shown). The potential of the supply voltage VSS corresponds to the potential of the scanning signal that turns the gate bus lines GL to the non-selected state.

As described above, by applying the driving image signals S(1) to S(m) to the respective source bus lines SL1 to SLm, and by applying the scanning signals GOUT(1) to GOUT(n) to the respective gate bus lines GL1 to GLn, an image in accordance with the image signal DAT sent from the outside is displayed in the display section 10.

1.2 Configuration of Gate Driver

Figure 4:
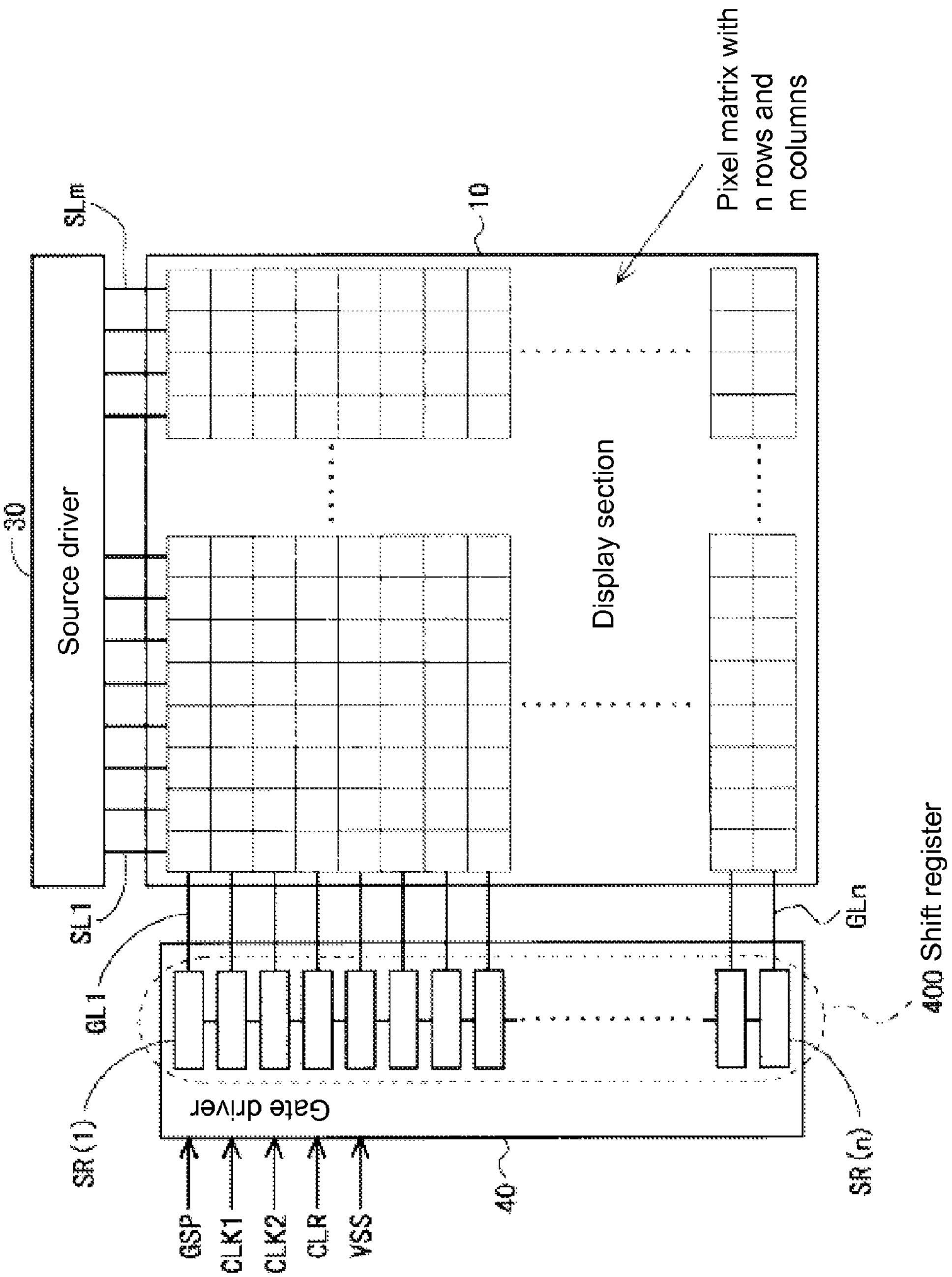
FIG. 4 is a block diagram for explaining a configuration of a gate driver in Embodiment 1 above.
Figure 11:
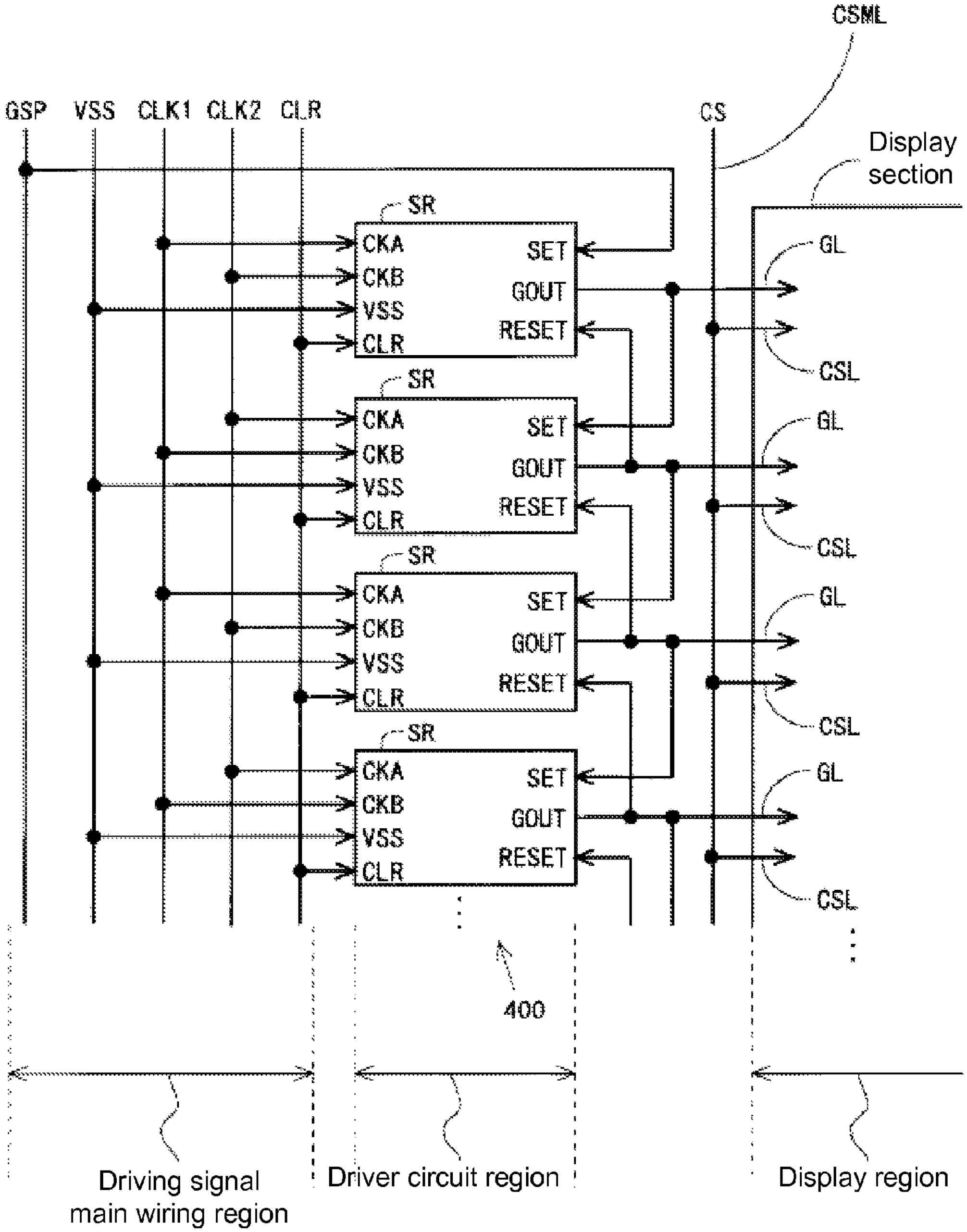
FIG. 11 is a block diagram showing one example of a configuration of a monolithic gate driver.
Figure 12:
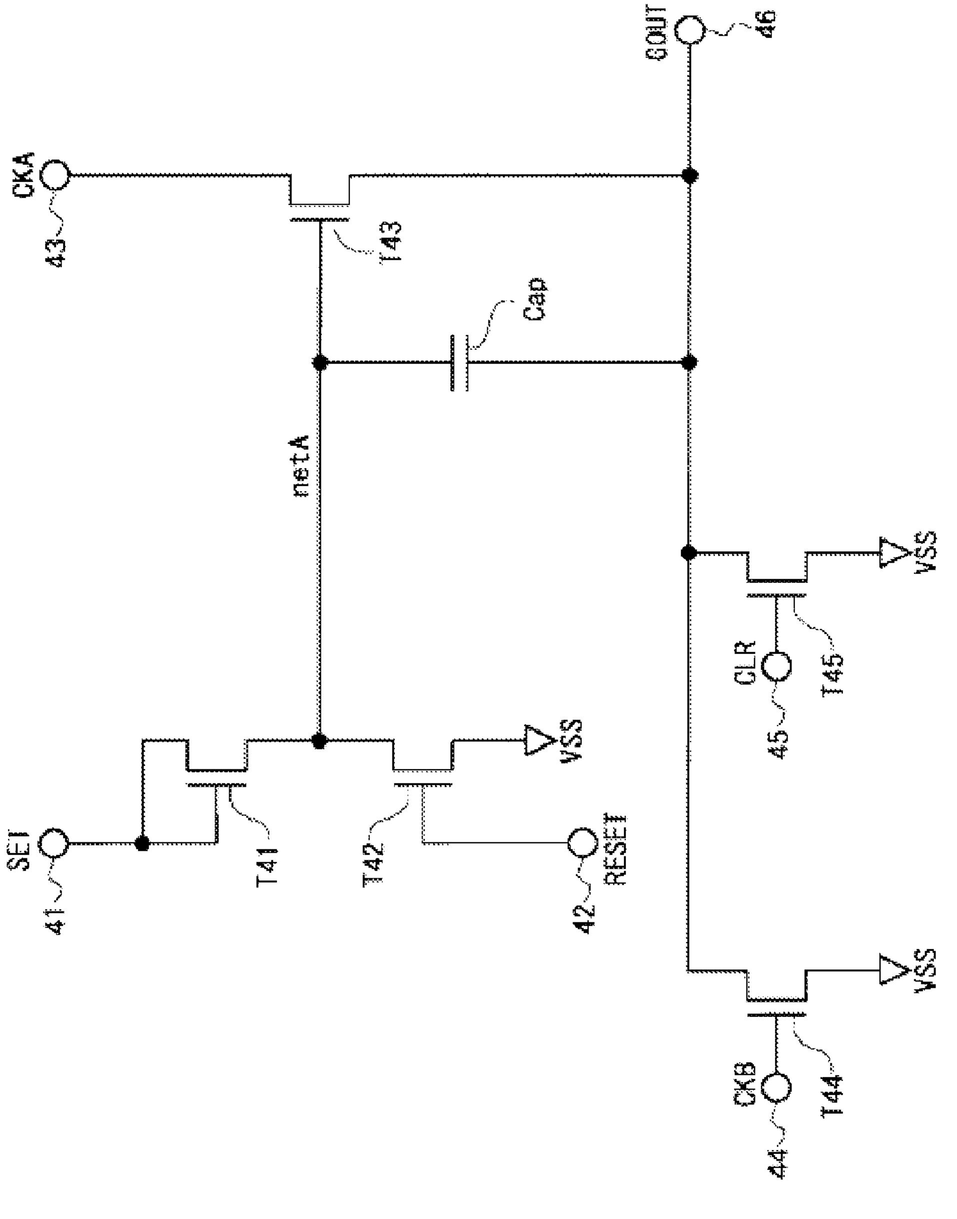
FIG. 12 is a circuit diagram showing a configuration example of one stage (bistable circuit) of a shift register that constitutes a monolithic gate driver.
Figure 13:
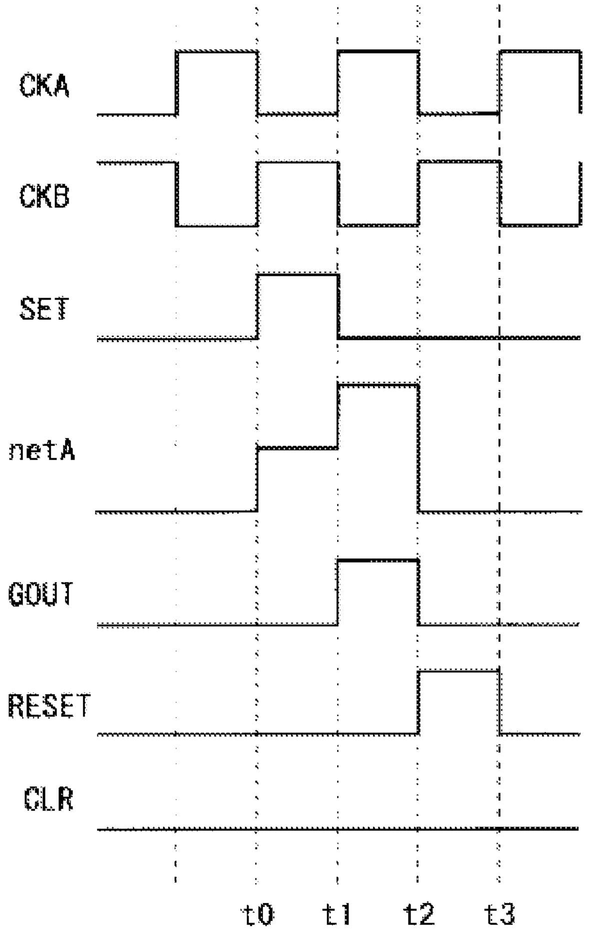
FIG. 13 is a timing chart for explaining an operation of a shift register.

Next, with reference to FIGS. 4, 11, and 12, a configuration of the gate driver 40 in this embodiment will be explained. As shown in FIG. 4, the gate driver 40 is made of the shift register 400 having n number of stages. In the display section 10, a pixel matrix with n rows and m columns is formed, and the respective stages of the shift register 400 are disposed so that one of the respective stages corresponds to one of the respective rows of the pixel matrix. Each of the stages of the shift register 400 is a bistable circuit that is in one of two states (first state and second state) at each point in time and that outputs a signal that indicates the state (state signal) as a scanning signal. That is, this shift register 400 is constituted of n number of bistable circuits SR(1) to SR(n).

A circuit configuration of the shift register 400 is the same as that of the conventional one. That is, a configuration between the respective bistable circuits is as shown in FIG. 11, and a specific circuit configuration inside of the bistable circuit is as shown in FIG. 12. Therefore, as in the conventional configuration, a capacitor Cap is formed between the gate and the source of an output transistor (thin film transistor T43 in FIG. 12) in each of the bistable circuits. The capacitor Cap functions as a bootstrap capacitor for increasing the potential of netA with increase in the potential of the output terminal 46.

In this embodiment, the thin film transistor T43 is provided as an output control thin film transistor, and the output terminal 46 is provided as an output node. Also, the gate electrode (gate terminal), the drain electrode (drain terminal), and the source electrode (source terminal) of the thin film transistor T43 correspond to a first electrode, a second electrode, and a third electrode, respectively.

1.3 Bootstrap Capacitor

Figure 5:
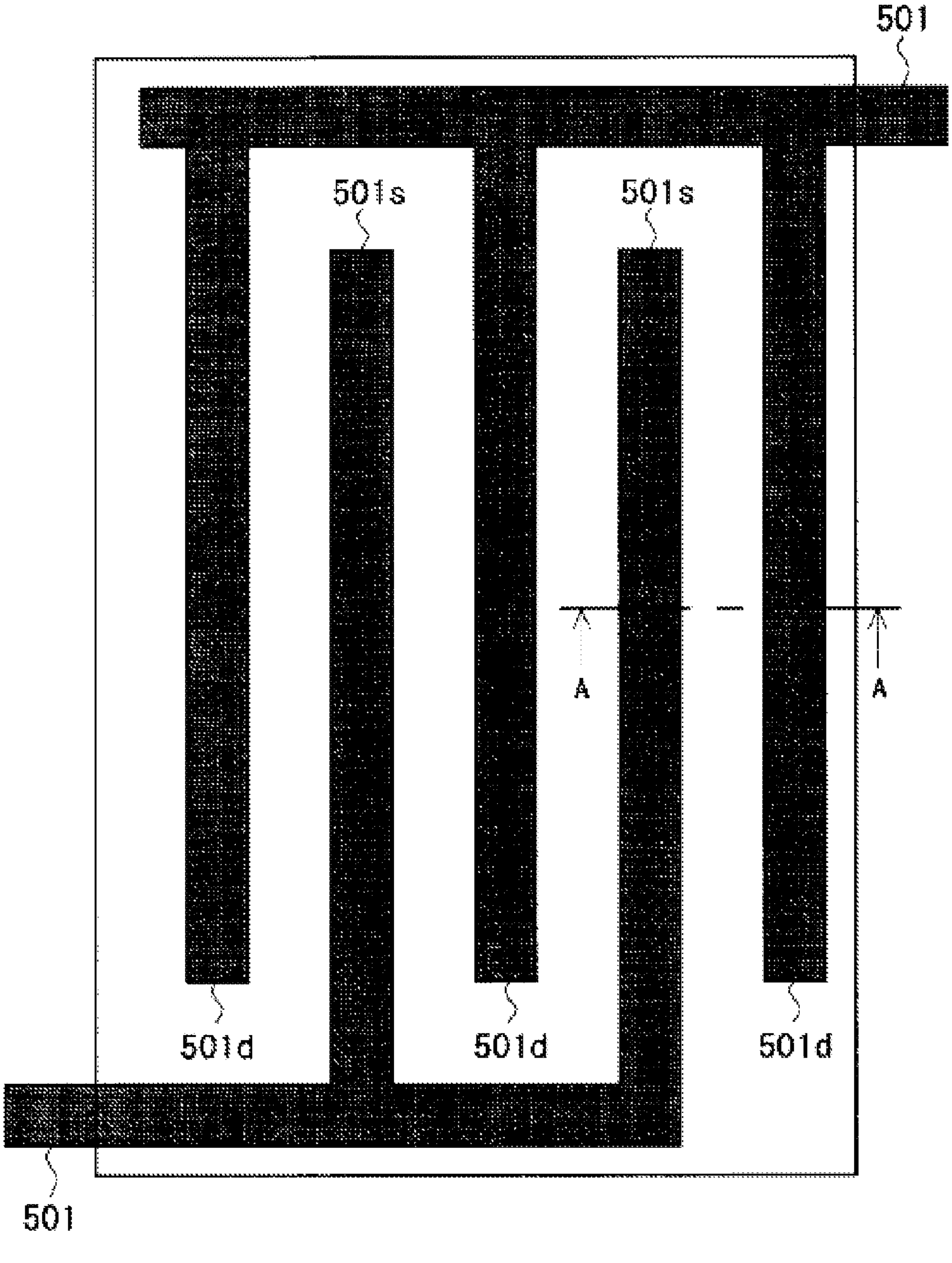
FIG. 5 is a layout diagram showing a part of an output transistor region in Embodiment 1 above.

A configuration to provide a bootstrap capacitor in this embodiment will be explained below. FIG. 5 is a layout diagram showing a part of an output transistor region. In the output transistor region, a source metal 501 is formed as shown in a plan view of FIG. 5. The source metal 501 includes a portion 501*d* and a portion 501*s* that form the drain electrode and the source electrode of the output transistor, respectively.

Figure 1:
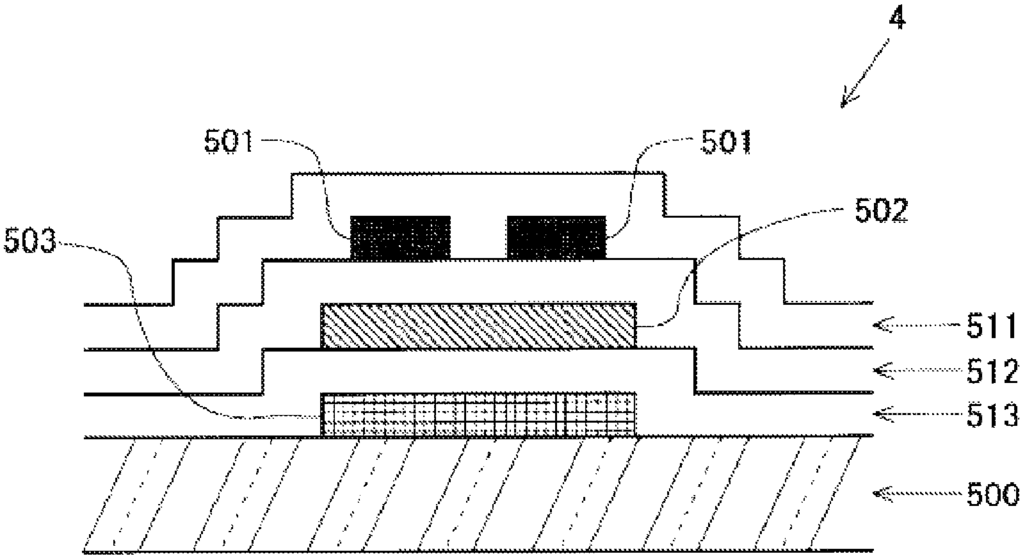
FIG. 1 is a partial cross-sectional view (cross-sectional view along the line A-A in FIG. 5) of an array substrate in an active matrix type liquid crystal display device according to Embodiment 1 of the present invention.

FIG. 1 is a cross-sectional view along the line A-A in FIG. 5. In FIG. 1, to take a close look at metal films (metal layers) in a laminated structure formed on a glass substrate 500, the source metal 501, a gate metal 502, and a third metal 503 are included in the array substrate 4. The source metal 501 is used to form a wiring pattern that includes source electrodes of thin film transistors disposed in the gate driver 40 and the pixel circuit. The gate metal 502 is used to form a wiring pattern that includes gate electrodes of the thin film transistors.

Figure 14:
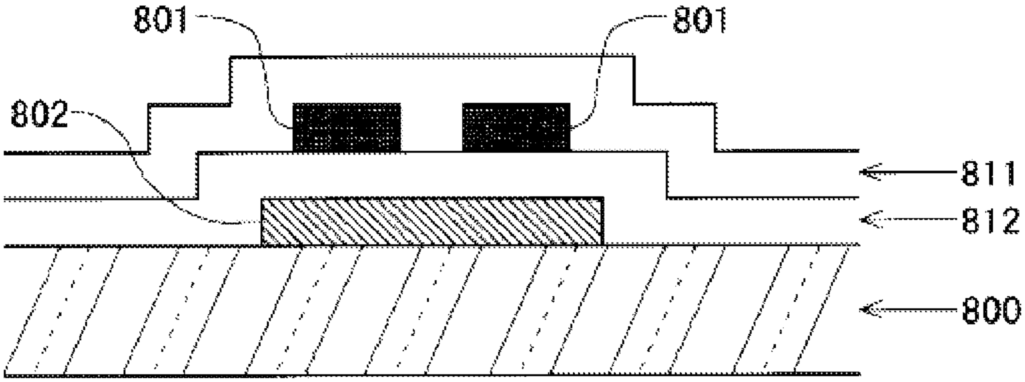
FIG. 14 is a partial cross-sectional view of an array substrate in a conventional configuration.

In a conventional configuration, the laminated structure that forms the array substrate 4 includes two metal films (source metal 801 and gate metal 802) only (see FIG. 14), but in this embodiment, the third metal 503 is further provided as another metal film. That is, in this embodiment, as shown in FIG. 1, the third metal 503, a third protective film 513 (that is formed so as to cover the third metal 503), the gate metal 502, a second protective film 512, the source metal 501, and a first protective film 511 are laminated on the glass substrate 500. However, the third metal 503 is disposed only in a region on the array substrate 4 located outside of the display region (region located outside of a region where a sealing material is applied). As a specific material for the source metal 501 and the gate metal 502, chrome (Cr), molybdenum (Mo), tantalum (Ta), titanium (Ti), aluminum (Al), or the like is used. The third metal 503 is also formed by using such a material. In this embodiment, the source metal 501 is provided as a first metal film, the gate metal 502 is provided as a second metal film, and the third metal 503 is provided as a third metal film.

In this embodiment, wiring lines that are formed in the driving signal main wiring region and the auxiliary capacitance main wiring line CSML are formed by the gate metal 502 or the source metal 501. The gate bus lines GL and the auxiliary capacitance wiring lines CSL are formed by the gate metal 502.

As discussed earlier, in the conventional configuration, the bootstrap capacitor was provided by the capacitance formed between the gate metal and the source metal. In contrast, in this embodiment, the bootstrap capacitor is provided by the capacitance formed between the gate metal 502 and the third metal 503. That is, in the bistable circuit having the configuration shown in FIG. 12, the capacitor Cap is formed by the gate metal 502 and the third metal 503 in the output transistor region. As indicated in FIG. 12, because the other end of the capacitor Cap needs to be connected to the source terminal of the output transistor (thin film transistor T43), the third metal 503 is electrically connected to the source metal 501 through a contact.

1.4 Effects

Figure 6:
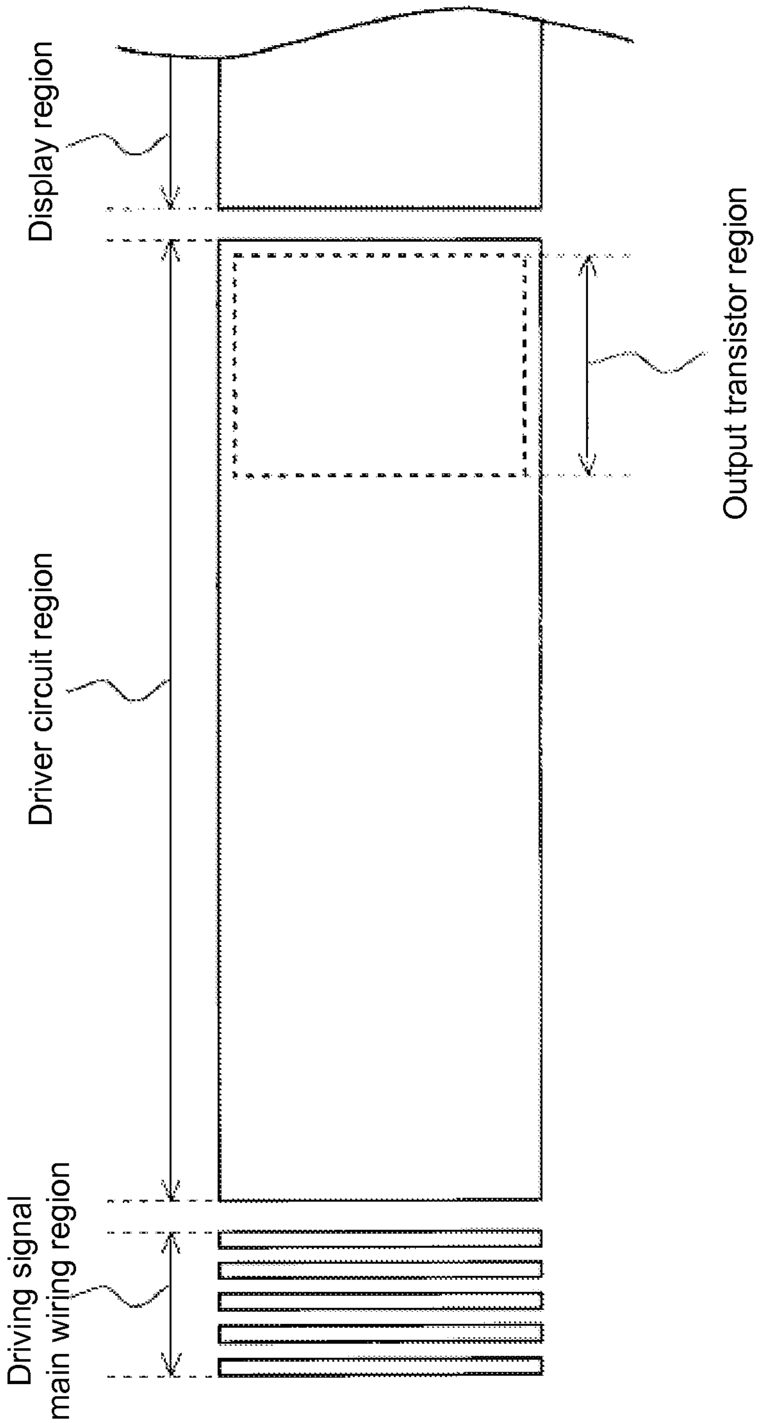
FIG. 6 is a diagram for explaining effects of Embodiment 1 above.
Figure 15:
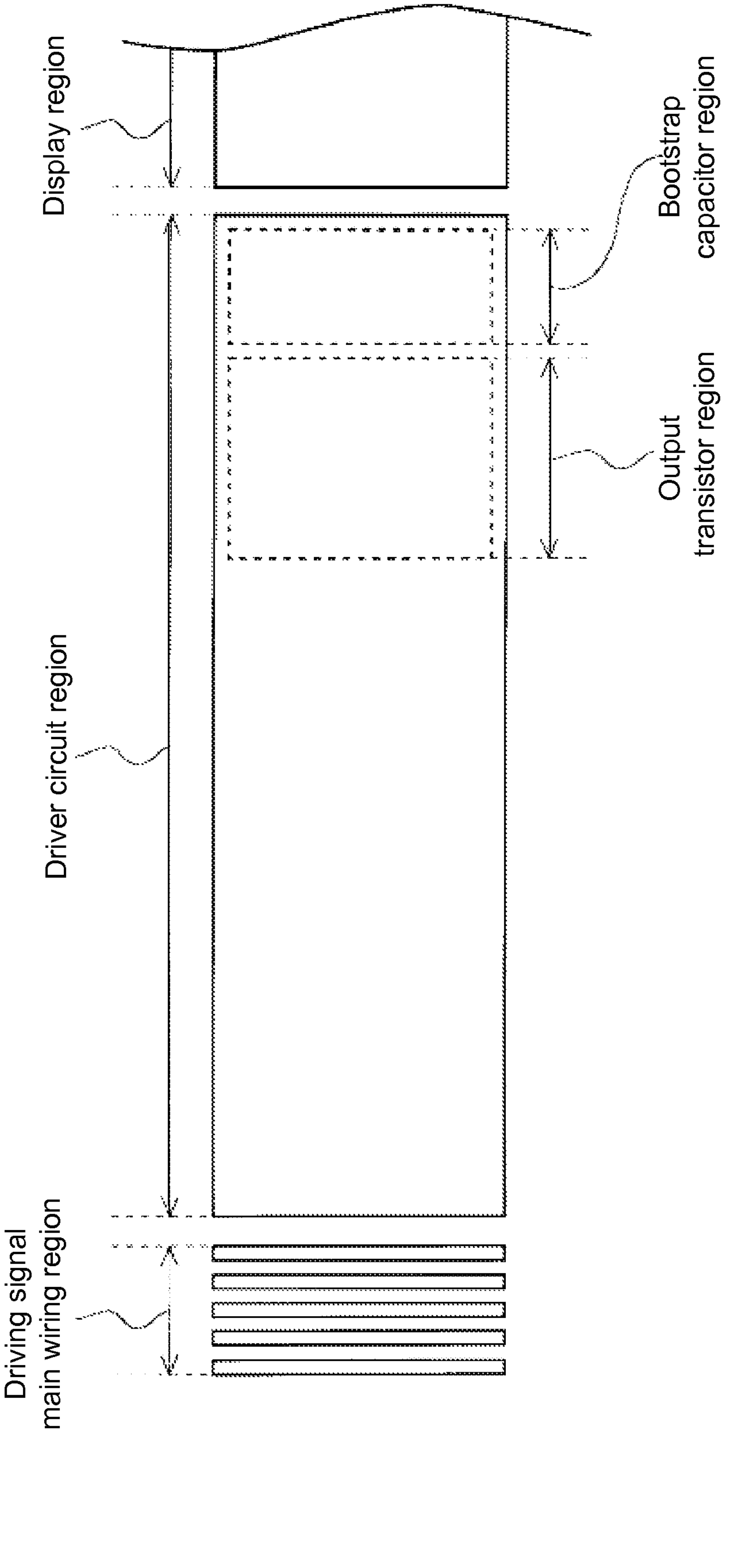
FIG. 15 is a diagram for explaining a region where a bootstrap capacitor is formed in a conventional configuration.

According to this embodiment, in the liquid crystal display device including the monolithic gate driver, the third metal 503 is formed as a metal film in the array substrate 4 that constitutes the panel, in addition to the source metal 501 and the gate metal 502. Also, in each of the bistable circuits SR of the shift register 400 that constitutes the gate driver 40, the capacitance formed between the gate metal 502 and the third metal 503 in the output transistor region is provided as the bootstrap capacitor for increasing the gate potential of the output transistor with increase in the source potential of the output transistor. The capacitance between the gate metal 502 and the third metal 503 is provided by using a layer located below the gate metal 502 in the laminated structure forming the array substrate 4 in the output transistor region. This eliminates the need for the region that has been required to form the bootstrap capacitor (bootstrap capacitor region in FIG. 15) in the conventional configuration. Therefore, it is possible to make the area of the driver circuit region smaller than that of the conventional configuration as shown in FIG. 6. As described, in the liquid crystal display device that includes a monolithic gate driver, the panel frame area can be made smaller than the conventional configuration, and therefore, the reduction in size is achieved.

2. Embodiment 2

2.1 Layout

Figure 7:
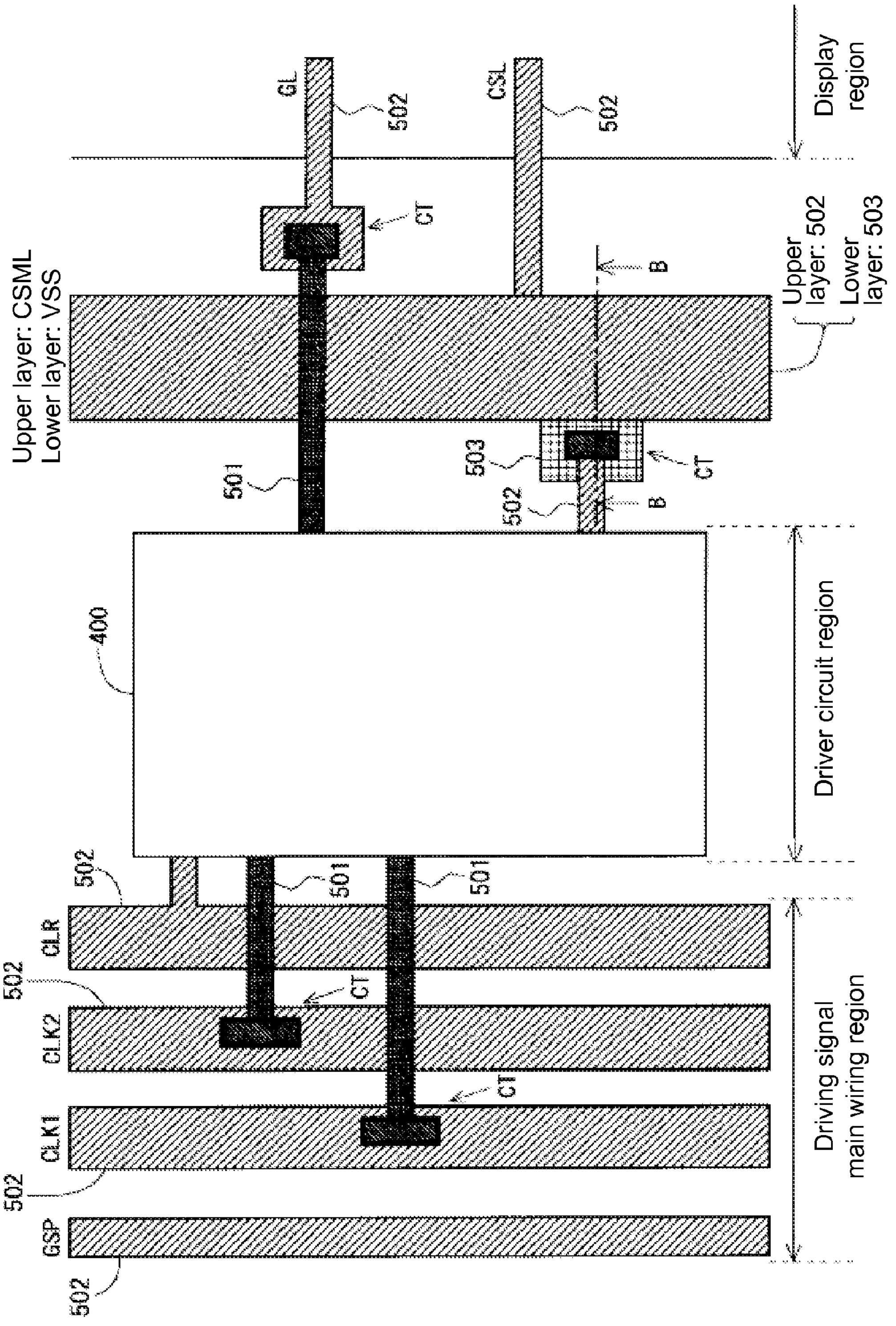
FIG. 7 is a layout diagram showing an area around a gate driver in an active matrix type liquid crystal display device according to Embodiment 2 of the present invention.

Next, Embodiment 2 of the present invention will be explained. The overall configuration and the configuration of the gate driver are the same as those of Embodiment 1 above, and therefore, the explanations thereof will be omitted (see FIGS. 2, 3, 4, and 12). FIG. 7 is a layout diagram showing an area around the gate driver 40 in this embodiment. In FIG. 7, to the left of the driver circuit region, the driving signal main wiring region is disposed. In the driving signal main wiring region, a main wiring line for the gate start pulse signal GSP, a main wiring line for the first gate clock signal CLK1, a main wiring line for the second gate clock signal CLK2, and a main wiring line for the clear signal CLR are formed. All of these wiring lines are formed by the gate metal 502. The respective bistable circuits in the shift register 400 and the main wiring line for the clear signal CLR are connected by wiring lines formed by the gate metal 502. The respective bistable circuits in the shift register 400 are connected to the main wiring line for the first gate clock signal CLK1 and the main wiring line for the second gate clock signal CLK2, respectively, by wiring lines formed by the source metal 501 through contacts CT provided in the driving signal main wiring region. The main wiring line for the gate start pulse signal GSP is connected only to the bistable circuit of the first stage in the shift register 400 by a wiring line formed by the source metal 501 through a contact (not shown) provided in the driving signal main wiring region.

Next, in FIG. 7, to take a close look at the right side of the driver circuit region, between the driver circuit region and the display region, the auxiliary capacitance main wiring line CSML and the main wiring line for the low-level supply voltage VSS are formed. To describe a positional relationship between the two, in the laminated structure that forms the array substrate 4, the auxiliary capacitance main wiring line CSML is formed in an upper layer side, and the main wiring line for the supply voltage VSS is formed in a lower layer side. Specifically, the auxiliary capacitance main wiring line CSML is formed by the gate metal 502, and the main wiring line for the supply voltage VSS is formed by the third metal 503. In the display region, the gate bus line GL and the auxiliary capacitance wiring line CSL are formed. Both the gate bus line GL and the auxiliary capacitance wiring line CSL are formed by the gate metal 502. The display region also includes the source bus line SL, the pixel electrode 101, the common electrode EC, and the like, but they do not directly relate to the present invention, and are therefore not shown in FIG. 7. The respective bistable circuits in the shift register 400 and the gate bus line GL are connected by a wiring line formed by the source metal 501 through a contact CT disposed between the driver circuit region and the display region. The respective bistable circuits in the shift register 400 and the main wiring line for the supply voltage VSS are connected by a wiring line formed by the gate metal 502 through a contact CT disposed between the driver circuit region and the display region.

Figure 8:
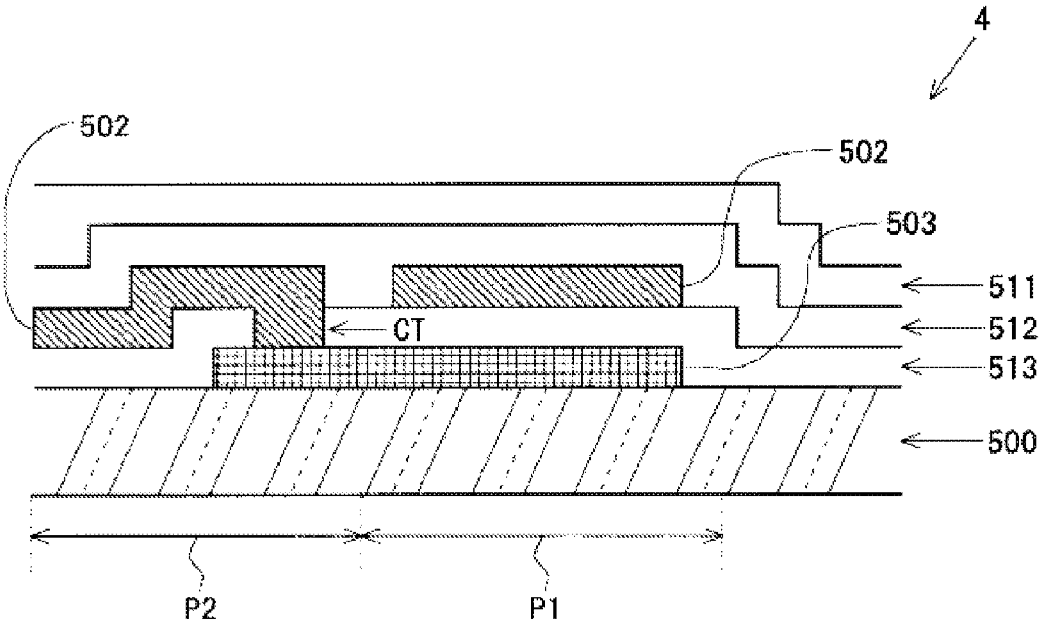
FIG. 8 is a cross-sectional view along the line B-B in FIG. 7.

FIG. 8 is a cross-sectional view along the line B-B in FIG. 7. In this embodiment as well, in a manner similar to Embodiment 1 above, three metal films (metal layers), which are the source metal 501, the gate metal 502, and the third metal 503, are disposed in the laminated structure that forms the array substrate 4. However, in the section taken along the line B-B in FIG. 7, the source metal 501 is not formed. Specifically, in a region indicated with the reference characters P1 and P2 in FIG. 8, the third metal 503, the third protective film 513, the gate metal 502, the second protective film 512, and the first protective film 511 are laminated on the glass substrate 500. In a portion of the region indicated with the reference character P2, the gate metal 502 and the third metal 503 are connected. The third metal 503 is disposed only in a region on the array substrate 4 located outside of the display region as in Embodiment 1.

Figure 9:
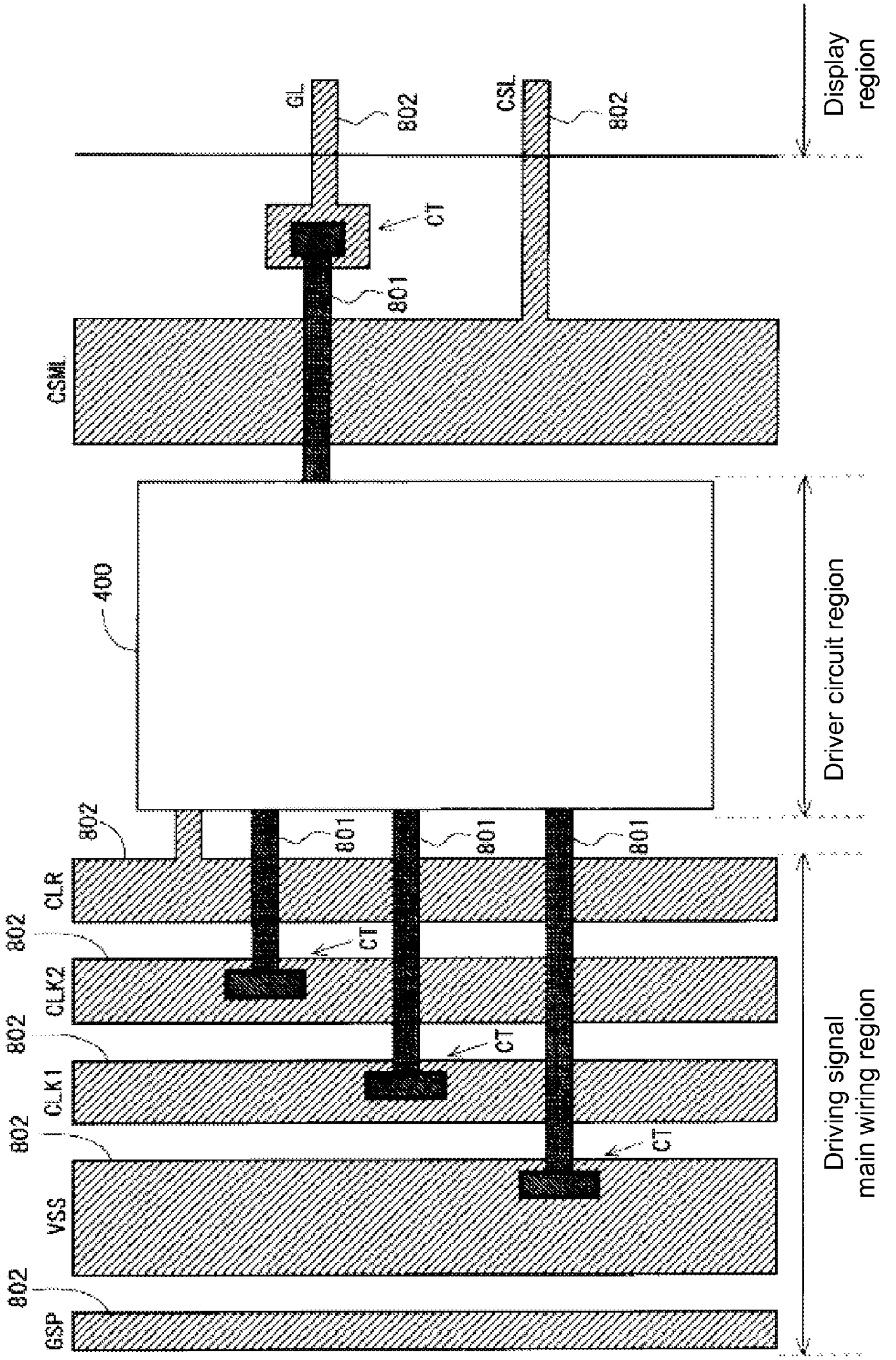
FIG. 9 is a layout diagram showing an area around a gate driver in a conventional configuration.

In the conventional configuration, a layout of the area around the gate driver 40 was as shown in FIG. 9. As indicated in FIG. 9, in the conventional configuration, the main wiring line for the supply voltage VSS was formed in the driving signal main wiring region. Also, in the driving signal main wiring region, the main wiring line for the supply voltage VSS was formed in the same layer as the main wiring line for the gate start pulse signal GSP, the main wiring line for the first gate clock signal CLK1, the main wiring line for the second gate clock signal CLK2, and the main wiring line for the clear signal CLR. In contrast, in this embodiment, the main wiring line for the supply voltage VSS is formed in a layer below the auxiliary capacitance main wiring line CSML in the region between the driver circuit region and the display region. That is, in the conventional configuration, the main wiring line for the supply voltage VSS and the auxiliary capacitance main wiring line CSML were disposed in the horizontal direction on the array substrate 4, but in the present embodiment, they are disposed in the vertical direction on the array substrate 4.

2.2 Effects

According to this embodiment, in the liquid crystal display device including the monolithic gate driver, the third metal 503 is formed as a metal film in the array substrate 4 that constitutes the panel, in addition to the source metal 501 and the gate metal 502. Also, the main wiring line for the supply voltage VSS, which has been conventionally formed in the driving signal main wiring region, is formed by the third metal 503 in a layer below the auxiliary capacitance main wiring line CSML that is formed by the gate metal 502 in the region between the driver circuit region and the display region. This makes it possible to reduce the area of the driving signal main wiring region as compared with the conventional configuration. As described, in liquid crystal display devices that include a monolithic gate driver, the panel frame area can be made smaller than the conventional configuration, and therefore, the reduction in size is achieved.

3. Embodiment 3

3.1 Layout

Figure 10:
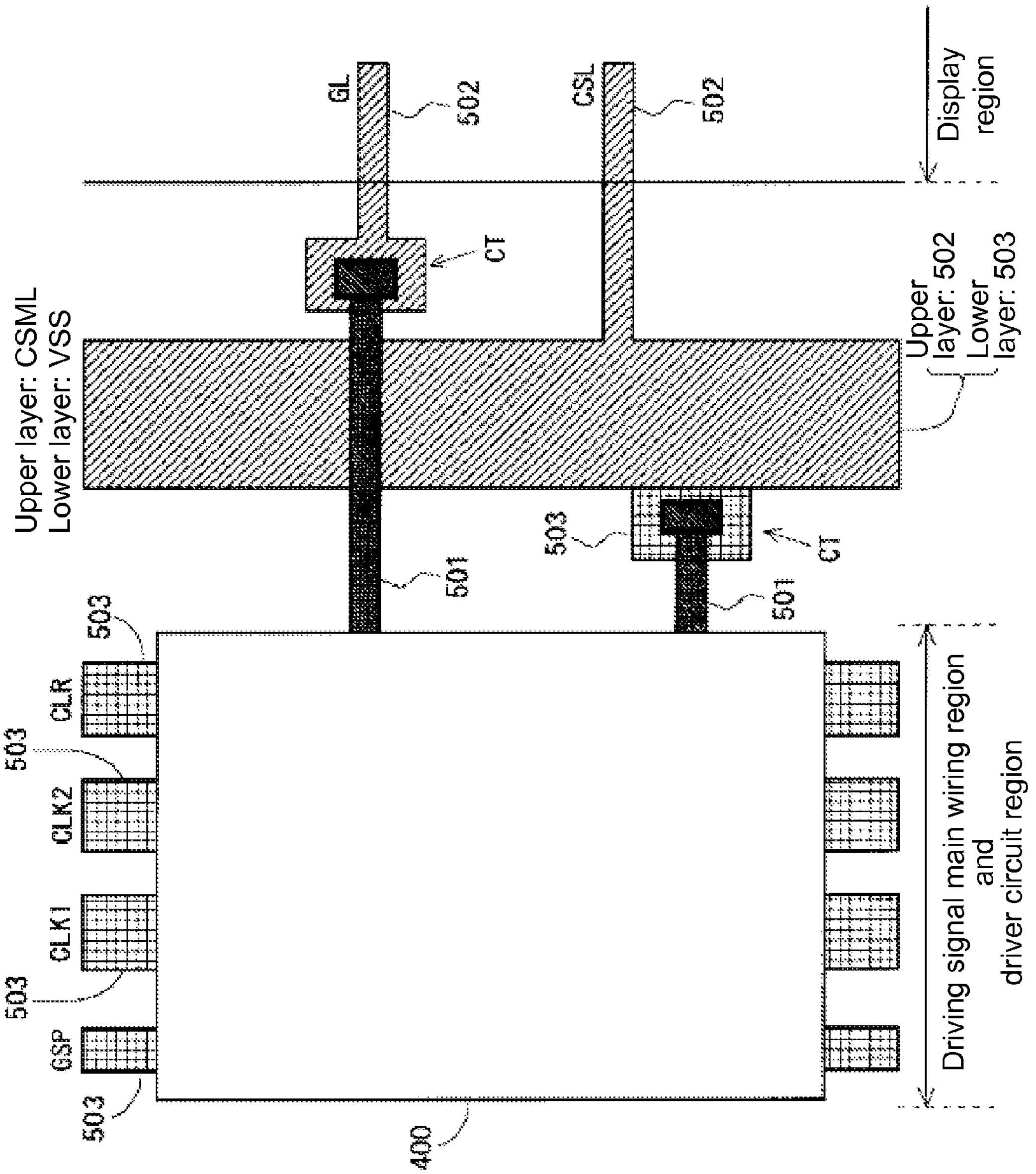
FIG. 10 is a layout diagram showing an area around a gate driver in an active matrix type liquid crystal display device according to Embodiment 3 of the present invention.

Next, Embodiment 3 of the present invention will be explained. The overall configuration and the configuration of the gate driver are the same as those in Embodiments 1 and 2 above, and therefore, the explanations thereof will be omitted (see FIGS. 2, 3, 4, and 12). Also, in a manner similar to Embodiments 1 and 2 above, three metal films (metal layers), which are the source metal 501, the gate metal 502, and the third metal 503, are disposed in the laminated structure that forms the array substrate 4 (see FIGS. 1 and 8). FIG. 10 is a layout diagram showing an area around the gate driver 40 in this embodiment. As shown in FIG. 10, in this embodiment, the main wiring line for the gate start pulse signal GSP, the main wiring line for the first gate clock signal CLK1, the main wiring line for the second gate clock signal CLK2, and the main wiring line for the clear signal CLR are formed in a layer below the shift register 400. Specifically, the respective bistable circuits that constitute the shift register 400 are formed by the gate metal 502 and the source metal 501 in a manner similar to the conventional configuration. Unlike the conventional configuration, however, the main wiring line for the gate start pulse signal GSP, the main wiring line for the first gate clock signal CLK1, the main wiring line for the second gate clock signal CLK2, and the main wiring line for the clear signal CLR are formed by the third metal 503. The respective bistable circuits in the shift register 400 and the respective driving signal main wiring lines are connected through contacts. As described, in the conventional configuration, the bistable circuits that constitute the shift register 400 and the driving signal main wiring lines were disposed in the horizontal direction on the array substrate 4, but in this embodiment, they are disposed in the vertical direction on the array substrate 4. Also, the main wiring line for the supply voltage VSS is formed by the third metal 503 in a layer below the auxiliary capacitance main wiring line CSML in the region between the driver circuit region and the display region in a manner similar to Embodiment 2.

3.2 Effects

According to this embodiment, in the liquid crystal display device including the monolithic gate driver, the third metal 503 is formed as a metal film in the array substrate 4 that constitutes the panel, in addition to the source metal 501 and the gate metal 502. Also, the main wiring line for the supply voltage VSS, which has been conventionally formed in the driving signal main wiring region, is formed by the third metal 503 in a layer below the auxiliary capacitance main wiring line CSML that is formed by the gate metal 502 in the region between the driver circuit region and the display region. Further, the driving signal main wiring lines, which have been conventionally formed to the left of the driver circuit region, are formed by the third metal 503 in a layer below the shift register 400. This allows the panel frame area to be made significantly smaller than that of the conventional configuration, thereby achieving a reduction in size in the liquid crystal display device that includes the monolithic gate driver.

4. Modification Examples and Others

In Embodiment 2 above, the configuration in which the main wiring line for the gate start pulse signal GSP, the main wiring line for the first gate clock signal CLK1, the main wiring line for the second gate clock signal CLK2, and the main wiring line for the clear signal CLR are formed by the gate metal 502 has been explained, but those wiring lines may also be formed by the source metal 501. In this case, the respective bistable circuits are connected to the main wiring line for the first gate clock signal CLK1 and the main wiring line for the second gate clock signal CLK2, respectively, by wiring lines formed by the gate metal 502. In Embodiments 2 and 3 above, the configuration in which the auxiliary capacitance main wiring line CSML is formed by the gate metal 502 has been explained, but the auxiliary capacitance main wiring line CSML may also be formed by the source metal 501. In this case, the gate bus line GL is to be extended directly from the respective bistable circuits to the display section without having the contact CT.

Further, in Embodiment 3 above, the main wiring line for the supply voltage VSS is formed in a layer below the auxiliary capacitance main wiring line CSML. However, a configuration in which the main wiring line for the supply voltage VSS is formed in the layer below the shift register 400 in a manner similar to the main wiring line for the gate start pulse signal GSP and the like is also possible. In Embodiment 3 above, the main wiring line for the gate start pulse signal GSP, the main wiring line for the first gate clock signal CLK1, the main wiring line for the second gate clock signal CLK2, and the main wiring line for the clear signal CLR are formed in the layer below the shift register 400, but a configuration in which only one or more of these main wiring lines are formed in the layer below the shift register 400 is also possible.

Figure 16:
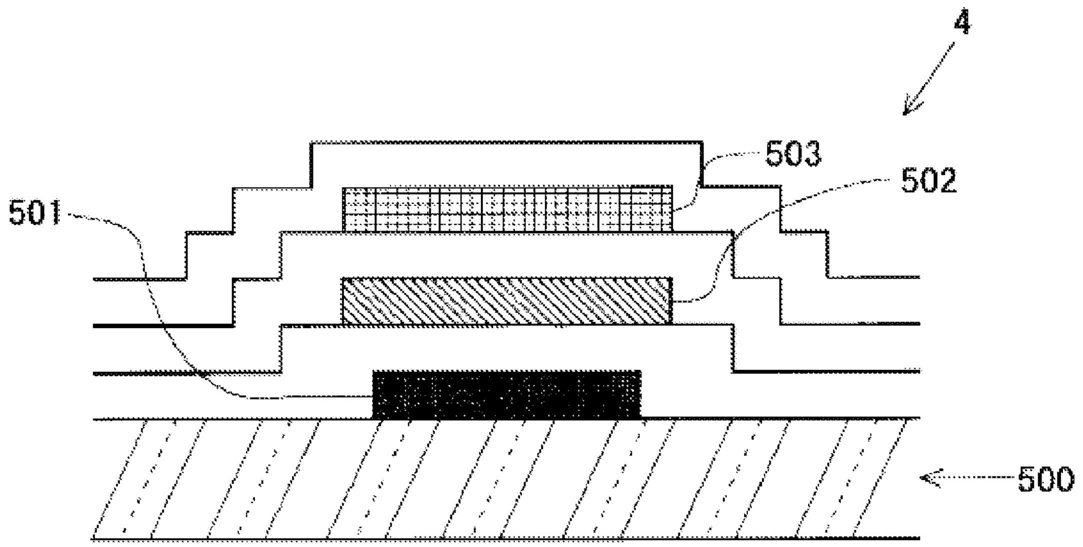
FIG. 16 is a partial cross-sectional view of an array substrate where a staggered a-Si TFT is employed.

Furthermore, in the respective embodiments above, the liquid crystal display device employing the a-Si TFT liquid crystal panel has been explained as examples, but the present invention can also be used for liquid crystal display devices employing panels other than the a-Si TFT liquid crystal panel. Also, in the respective embodiments above, examples of employing the inverse staggered a-Si TFT have been explained, but this present invention can also be used for cases in which a staggered a-Si TFT is employed. In this case, a partial cross-sectional view of the array substrate 4 in Embodiment 1 above becomes as shown in FIG. 16, for example. That is, referring to the metal films (metal layers) in the laminated structure on the glass substrate 500, the respective metals are formed such that the source metal 501 is disposed on the lower layer, and the gate metal 502 and the third metal 503 are disposed in this order toward the upper layer.

DESCRIPTION OF REFERENCE CHARACTERS

4 array substrate
10 display section
40 gate driver (scanning signal line driver circuit)
400 shift register
500, 800 glass substrate
501, 801 source metal
502, 802 gate metal
503 third metal
Cap capacitor
CLK1 first gate clock signal
CLK2 second gate clock signal
CLR clear signal
CS auxiliary capacitance driving signal
CSL auxiliary capacitance wiring line
CSML auxiliary capacitance main wiring line
CT contact
GL gate bus line
GSP gate start pulse signal
GOUT scanning signal
SR bistable circuit
T41 to T45 thin film transistors (TFTs)
VSS low-level supply voltage

The invention claimed is:

1. A liquid crystal display device, comprising:

a substrate;

a pixel circuit formed in a display region that is a region on the substrate provided for image display;

a plurality of scanning signal lines that are formed in the display region and that constitute a part of the pixel circuit; and a scanning signal line driver circuit that is formed in a region outside of the display region and that includes a shift register made of a plurality of bistable circuits connected in series with each other, the plurality of bistable circuits each having a first state and a second state and turning to the first state sequentially in accordance with a plurality of clock signals received from the outside, the scanning signal line driver circuit selectively driving the plurality of scanning signal lines, wherein the substrate has a layered structure that includes a first metal film that forms a wiring pattern including source electrodes of thin film transistors that are provided in the pixel circuit and in the scanning signal line driver circuit, a second metal film that forms a wiring pattern including gate electrodes of the thin film transistors, and a third metal film that is formed in the region outside of the display region, and wherein the third metal film is electrically connected to at least one of the first metal film and the second metal film through a contact disposed in the region outside of the display region.

2. The liquid crystal display device according to claim 1, wherein each of the bistable circuits comprises:

an output node that is connected to a corresponding scanning signal line and that outputs a scanning signal indicating one of the first state and the second state;

an output control thin film transistor that includes a first electrode as a gate electrode, a second electrode as one of a drain electrode and a source electrode that receives one of the plurality of clock signals, and a third electrode as the other of the drain electrode and the source electrode that is connected to the output node, the output control thin film transistor controlling a potential of the third electrode based on a voltage applied to the first electrode; and a capacitance formed between the first electrode and the third electrode, wherein the capacitance is formed by the second metal film that forms the first electrode and the third metal film that is electrically connected through the contact to the first metal film that forms the third electrode in a layer above or below a region where the output control thin film transistor is formed.

3. The liquid crystal display device according to claim 1, further comprising:

a pixel electrode that is disposed in a matrix in the display region;

a plurality of auxiliary capacitance wiring lines disposed in the display region so as to form an auxiliary capacitance with the pixel electrode;

an auxiliary capacitance main wiring line that is formed in a region outside of the display region by the first metal film or the second metal film so as to transmit a voltage signal that is to be applied to the plurality of auxiliary capacitance wiring lines; and a main wiring line for a supply voltage that transmits a reference potential signal so that a prescribed reference potential is provided to the plurality of bistable circuits, wherein the main wiring line for the supply voltage is formed by the third metal film in a layer above or below a region where the auxiliary capacitance main wiring line is formed.

4. The liquid crystal display device according to claim 1, further comprising:

a driving signal main wiring line formed in the region outside of the display region for transmitting a plurality of control signals that are to be provided to the plurality of bistable circuits so as to drive the shift register to perform a shift operation, wherein the driving signal main wiring line is formed by the third metal film in a layer above or below a region where the plurality of bistable circuits are formed.

5. The liquid crystal display device according to claim 4, wherein the driving signal main wiring line includes a main wiring line for the plurality of clock signals, a main wiring line for a start signal that instructs the shift register to start the shift operation, and a main wiring line for a clear signal that turns all of the plurality of bistable circuits to the second state.

6. The liquid crystal display device according to claim 1, further comprising:

a pixel electrode that is disposed in a matrix in the display region;

a plurality of auxiliary capacitance wiring lines formed in the display region so as to form an auxiliary capacitance with the pixel electrode;

an auxiliary capacitance main wiring line that is formed in a region outside of the display region by the first metal film or the second metal film so as to transmit a voltage signal that is to be applied to the plurality of auxiliary capacitance wiring lines;

a main wiring line for a supply voltage that transmits a reference potential signal so that a prescribed reference potential is provided to the plurality of bistable circuits; and a driving signal main wiring line formed in the region outside of the display region for transmitting a plurality of control signals that are to be provided to the plurality of bistable circuits so as to drive the shift register to perform a shift operation, wherein the main wiring line for the supply voltage is formed by the third metal film in a layer above or below a region where the auxiliary capacitance main wiring line is formed, and wherein the driving signal main wiring line is formed by the third metal film in a layer above or below the region where the plurality of bistable circuits are formed.

7. The liquid crystal display device according to claim 1, wherein the third metal film is made of a same type of metal as the first metal film or the second metal film.

8. The liquid crystal display device according to claim 1, wherein amorphous silicon is used for a semiconductor layer of the thin film transistors disposed in the pixel circuit and in the scanning signal line driver circuit.

* * * * *